Patented Oct. 17, 1933

1,930,853

UNITED STATES PATENT OFFICE 1,930,853

PRODUCTION OF DISPERSIONS

Leo Kollek and Franz Pohl, Ludwigshafen-on-the-Rhine, Germany, assignors to I. G. Farbenindustrie Aktiengesellschaft, Frankfort - on - the-Main, Germany No Drawing. Application November 26, 1930, Serial No. 498,429, and in Germany December 11, 1929

10 Claims. (Cl. 252—6)

The present invention relates to the production of dispersions.

We have found that highly stable and uniform, more or less colloidal dispersions, i. e. suspensions or emulsions, of a great variety of non-gaseous substances in inorganic or organic liquids, in which the said substances, i. e., suitable solid and liquid substances are practically insoluble, are produced by incorporating at least one of the components of the dispersions, namely either the said substances, or the liquid dispersing medium required, or both, with viscoid polymerization products of alkylene oxides. By the term "viscoid polymerization products of alkylene oxides" I wish to define in the following and in the claims the higher polymerization products of alkylene oxides which are viscous at room temperature as well as those which are more or less solid and become viscous liquids on heating in contradistinction to dioxane which is a thin liquid at room temperature and readily crystallizes on cooling to about 8° C.

The viscoid polymerization products obtainable for example by the polymerization of ethylene oxide with amines, alkali metals, caustic alkalies, metal halides or other substances having a polymerizing action, usually have a molecular size above 5 molecules of alkylene oxide in contrast to dioxane and possess excellent dispersing properties notwithstanding their viscous or more or less solid nature and contrasted with many other known dispersing agents have many advantages as dispersing agents. Thus for example many of these products are completely neutral colourless substances, to a great extent chemically inert and also to a high degree stable against chemical agents such as acids or alkalies and also against changes of temperature.

The polymerization products are in part oily substances and in part solid wax-like substances and many of them have the further advantage, contrasted with many other dispersing agents, of being soluble not only in water or aqueous solutions but also usually readily soluble in organic solvents as for example alcohols, such as methyl, ethyl or benzyl alcohols, esters, ketones, glycol ethers, hydrocarbons of the benzene series or chlorinated hydrocarbons, methyl, ethyl or butyl acetates, acetone, cyclohexanone, mono-alkyl ethers of ethylene glycol, chloroform, methylene chloride and other solvents and therefore are eminently suitable for employment as dispersing agents for substances which are insoluble in these solvents.

A great variety of substances such as film-forming agents as for example natural waxes of vegetable, animal or mineral origin, synthetic products having the physical properties of waxes as for example bleached Montan wax or otherwise modified Montan wax, tars, asphalts, oils, fats, solutions of cellulose derivatives as for example cellulose nitrate carboxylates and ethers, and also hydrocarbons, higher alcohols, ketones, amines, esters, acids, pigments, dyestuffs, natural resins, synthetic resins and the like may be converted into stable emulsions or suspensions with the aid of the said viscoid polymerization products of alkylene oxides. The quantity of the viscoid polymerization products employed depends on the purpose for which the preparations are intended and the nature of their principal constituents, the quantities varying generally between 0.5 and 200 per cent of the materials to be dispersed. Thus for example, polishing preparations may contain from 0.5 to 200 per cent of waxes or other film-forming substances depending on the nature of the preparations desired, fluid emulsions being obtained with low quantities of polymerization product and large quantities of liquid dispersing medium and more or less stiff pastes being obtained from large quantities of polymerization product and low quantities of liquid dispersing medium. Other coating preparations suitable for spraying and like mechanical application will usually contain the aforesaid lower quantities of polymerization product and large quantities of dispersing medium. Preparations containing colouring materials may contain very small quantities, say from 0.5 to 10 per cent of the colouring matter, of the polymerization product if the preparations be not intended for printing purposes in which case the quantities of polymerization product in the ink or paste may be increased.

The production of the suspensions or emulsions may be carried out according to any known or suitable method. For example, if the substances to be suspended or emulsified have a solvent action for the viscoid alkylene oxide polymerization products it may be preferable to dissolve the alkylene oxide polymerization product in these substances or to fuse them together, the resulting product then being treated with the liquid dispersing medium in a suitable manner, preferably while heating. In other cases it may be advantageous to suspend or emulsify the substances to be dispersed in concentrated solutions of the alkylene oxide polymerization products and then to dilute the concentrated dispersions with the same or with another liquid dispersing medium, the dispersions obtained then being mechanically homogenized according to known methods if desired.

Especially valuable pigment preparations (that is dispersions of water-insoluble organic dyestuffs), colour lakes, metal or mineral pigments and the like, can be produced in accordance with the present invention by mixing the colouring materials with, or preparing them in the presence of viscoid polymerization products of alkylene oxides, especially of ethylene oxide.

The pigment preparations can be prepared by simply mixing a water-insoluble colouring material with the polymerization products, or dispersions thereof in water, aqueous liquids or organic liquids, or the colouring materials may be prepared in the water-insoluble form by incorporating one or more water-soluble components of the water-insoluble colouring materials with the polymerization products or dispersions thereof and then producing the colouring material in its water-insoluble form. Thus for example lakes may be prepared by incorporating a solution of the dyestuff with a polymerization product of the aforesaid nature and then precipitating the water-insoluble colouring material either by adding to the solution the substratum into which the dyestuff is to be deposited, or a metal salt giving a water-insoluble compound with the dyestuff or an acid oxide of a metal, such as tungstic acid, or a single or complex compound thereof, also giving a water-insoluble compound with the dyestuff. Similarly, developer dyestuffs as well as vat or sulphur dyestuffs may be prepared from their constituents or, respectively, from their vats, for example in-revatting, in the presence of polymerization products. When precipitating the water-insoluble dyestuffs from the water-soluble components the polymerization products may also be added to the component which is employed for carrying out the precipitation, and in some cases it is advantageous to work in the presence of the usual emulsifying agents such as Turkey red oils, sulphonic acids, or their salts, of long chain aliphatic or of polynuclear aromatic compounds, such as of alcohols, fats, acids of fats, and alkylated naphthalenes, resin soaps and the like.

The pigments, pigment dyestuffs, colour lakes and the like prepared in the said manner are distinguished by great strength of colour and usually by a special clarity of shade contrasted with the pigment preparations prepared in the usual manner. Moreover, the fastness to light of the pigment preparations is, generally speaking, especially good. In the working up of powders or pigments diluted with solid diluents, such as chalk, metal bronzes and like material, which as is well known in many cases are not readily wetted with water, the employment of the said polymerization products is advantageous since they impart an increased wetting action without any objectionable foaming.

In the preparation of the emulsions or suspensions, solvents for the substances to be treated may be present or other emulsifying and dispersing agents may be added, such as soaps, glues, vegetable protective colloids, water-soluble sulphonated organic compounds, such as Turkey red oil and like sulphuric esters, or sulphonic acids, or their salts, of aliphatic, cycloaliphatic or aromatic compounds. The emulsions and suspensions prepared by means of the polymerization products of alkylene oxides may be also employed for a great variety of industrial purposes other than those referred to above. For example they may find useful application as dispersing agents in the preparation of sizes, dressings, impregnating compositions, agents for combating pests and the like.

The following examples will further illustrate the nature of this invention, but the invention is not restricted to these examples. The parts are by weight.

*Example 1*

Bleached Montan wax is fused together with an equal amount of a solid, wax-like polymerization product of ethylene oxide (softening point about 50° C.) obtained by allowing ethylene oxide to stand at about 10° below zero C. with about 1 per cent its weight of sodium oxide or by heating ethylene oxide with about 0.1 per cent of caustic soda solution to from 50° to 60° C., the melt then being heated in ten times its weight of water while stirring. An emulsion is obtained which after cooling becomes very viscous and which, if desired, may be further diluted with water while heating, without deflocculation of the wax, and may be employed as a polish. Instead of Montan wax, stearic acid, montanic acid, tallow, wool fat and similar substances may be emulsified in an analogous manner.

*Example 2*

Gum mastic is fused together with an equal weight of the ethylene oxide polymerization product specified in Example 1 and the melt is then warmed with five times its weight of water while stirring. A highly dispersed stable emulsion is formed which may be employed, for example, for sizing paper.

The gum mastic may also be replaced by other resinous products as for example colophony and the like.

*Example 3*

100 parts of a lacquer obtained by dissolving in 60 parts of the acetate of ethylene glycol monoethylether with the addition of 10 parts of tri-normal-butyl phosphate, 20 parts of a pyroxylin which is readily soluble in alcohol to give solutions of low viscosity and which has been moistened with 10 parts of butanol, are treated for about 48 hours at room temperature in a suitable emulsifying apparatus, as for example a ball mill, together with a solution of 15 parts of the ethylene oxide polymerization product specified in Example 1 in 35 parts of water. A highly dispersed, stable emulsion is thus obtained, which may be employed for coating purposes.

*Example 4*

1 part of the ethylene oxide polymerization product specified in Example 1 is dissolved while heating in 10 parts of castor oil. The solution solidifies to a stiff paste when cooled and this paste yields a milky emulsion when treated with hot water without deflocculation of the oil. The preparation may be used as a softening agent, for example for the product prepared according to Example 3.

*Example 5*

A solution of 1 part of the ethylene oxide polymerization product specified in Example 1 in 5 parts of tricresyl phosphate solidifies to a pulp when cooled and this pulp yields a stable emulsion by treatment with water while heating. The preparation may be used as a softening agent, for example for the product prepared according to Example 3.

*Example 6*

100 parts of a very viscous nitrocellulose lacquer, consisting for example of 20 parts of a collodion cotton the solutions of which show a low viscosity, 7.5 parts of benzyl butyl phthalate, 2.5 parts of resin obtained by condensation of methyl cyclohexanone with the aid of alkali, 2.5 parts of Lithol Fast scarlet and 68.5 parts of ethylene glycol monobutyl ether, is mixed with 10 parts of dimethyl cellulose and 10 parts of a polymerization product from propylene oxide which is soluble to a slight extent in water and has been obtained by allowing propylene oxide to stand at about 0° C. with about 1 per cent its weight of sodium oxide. The mixture is introduced into 200 parts of water while stirring and a very stable emulsion is obtained which may be employed for coating purposes.

*Example 7*

1 part of bleached Montan wax is melted down together with 0.5 part of a wax-like polymerization product of ethylene oxide melting at 52° C. After cooling the melt to 60° C., about 10 times its weight of ethyl alcohol are stirred into it, whereby a milky dispersion is obtained which, on cooling, solidifies to a pulpy paste.

*Example 8*

5 parts of a solid wax-like polymerization product of ethylene oxide having a softening point of about 54° C. are fused with 4 parts of ozocerite, 6 parts of bleached Montan wax and 3 parts of a preparation consisting of 10 parts of Nigrosine Base (Schultz, Farbstofftabellen, 1923, No. 693), 10 parts of stearine and 10 parts of crude Montan wax. While stirring, 35 parts of water are introduced into the melt. A homogeneous paste free from granular matter is obtained which may find useful application as a boot polish.

*Example 9*

5 parts of the polymerization product referred to in the foregoing example are fused together with 5 parts of Montan wax, 5 parts of carnauba wax and 2 parts of castor oil until a homogeneous mass is obtained which is then incorporated with 50 parts of water, while stirring. A semi-solid mass is obtained which may find useful application as a floor polish. Wood or linoleum polished with the preparation show an excellent gloss and a good resistance to water.

*Example 10*

60 parts of a white, wax-like polymerization product of ethylene oxide, prepared by dissolving a crude polymerization product of ethylene oxide in benzene and precipitation with the aid of ethyl ether, are fused with 60 parts of purified wool grease. A solution of 20 parts of boric acid in 60 parts of glycerol and 20 parts of water is then slowly introduced into the melt. A stiff paste is obtained which may find useful application as a base for the production of salves or ointments owing to the physiological inactivity of the polymerization product.

*Example 11*

100 parts of green earth are made into a paste with from 50 to 100 parts of water and 1 part of a polymerization product of ethylene oxide having a melting point of 54° C. dissolved in water in the ratio of 1:10; and then 2.5 parts of a basic dyestuff, as for example New Fuchsine (Schultz, Farbstofftabellen 1923, vol. 1, No. 513), dissolved in 250 parts of water are added. A colour lake is obtained which contrasted with the green earth lake prepared without the employment of the said polymerization product is distinguished by greater clarity and brightness of shade and also an improved fastness to light and can be employed for cheap paints such as lime distempers.

*Example 12*

The following substances are mixed while stirring in the order given: 20 parts of heavy spar, 10 parts of aluminum sulphate (10 per cent solution in water), 5 parts of calcined soda (10 per cent aqueous solution) 12.5 parts of barium chloride (10 per cent aqueous solution), and 5 parts of powdered Hansa green G (Colour Index 1924, page 354). 0.5 part of a polymerization product of ethylene oxide having a melting point of 50° C. (10 per cent aqueous solution) is then added and the whole is precipitated with 6 parts of barium chloride and 0.5 part of aluminium sulphate (10 per cent aqueous solution). A colour lake is obtained which contrasted with the colour lake prepared without the employment of the said polymerization product gives purer and more brilliant shades when brushed on. The fastness to light is very good and the preparation may be employed for wall-paper paints.

*Example 13*

10 parts of aluminium sulphate (containing 18 per cent of $Al_2O_3$ and in the form of a 10 per cent aqueous solution), 5 parts of calcined soda (10 per cent aqueous solution, and 50 parts of water are mixed at 50° C., boiled for an hour, allowed to cool to 50° C. and then 3.9 parts of disodium phosphate (10 per cent aqueous solution) and 3 parts of calcined soda (10 per cent aqueous solution) are added at 50° C. Then 18 parts of a 20 per cent aqueous paste of Alizarine red (Schultz, Farbstofftabellen 1923, vol. 1, No. 778) which have been intimately mixed with 1.44 parts of a polymerization product of ethylene oxide having a melting point of 48° C. (10 per cent aqueous solution) and to which have been added 3.9 parts of Turkey red oil are added and the whole stirred for 1 hour. The whole is allowed to stand for about 12 hours and 550 parts of water are added, the whole is slowly heated up to the boiling point during the course of 6 hours and kept at the same temperature for 3 hours. Towards the end 0.4 part of aluminium sulphate (10 per cent aqueous solution), 0.1 part of calcined soda (10 per cent aqueous solution) and 20 parts of heavy spar are added to the boiling mixture and boiling continued for some time. A colour lake is obtained the shade of which is equally as strong as that of colour lakes obtained without the employment of the said polymerization product but containing about 15 to 30 per cent more of colouring matter.

The product may find useful application for light-resistant paints for wall-papers.

*Example 14*

13.8 parts of paranitraniline are made into a paste with 10 parts of water and 7.5 parts of sodium nitrate and mixed with 50 parts of water. The whole is diluted with a further 250 parts of cold water and 40 parts of hydrochloric acid of 20° Baumé strength are allowed to flow in. The resulting diazo solution is allowed to flow slowly while stirring well into a solution which has been prepared from 15 parts of beta-naphthol dissolved in 50 parts of water, 13 parts of caustic soda of 40° Baumé strength and 10 parts of calcined soda diluted with 100 parts of water and which also contains about 3.4 parts of a polymerization product of an alkylene oxide, as for example of ethylene oxide, having a melting point of 57° C. and is dissolved in from 1 to 10 times its weight of water. When the coupling is completed the whole is worked up in the usual manner. In order to prepare adulterated preparations, 400 parts of heavy spar for example may be added. The preparation of the pigment may also be carried out in the presence of one of the usual emulsifying agents, as for example Turkey red oil, or the sulphonic acids referred to above, such as propyl or butyl naphthalene sulphonic salts, resin soaps and the like, about 3 parts being usually employed. The resulting pigment which may be employed for oil paints has great strength of colour and the shades of the adulterated products have an improved fastness to light.

Example 15

50 parts of heavy spar, 100 parts of a 4 per cent aqueous paste of aluminum hydrate and 10 parts of 25 per cent aqueous paste of Autol red RLP (Schultz, Farbstofftabellen 1923, vol. 1, No. 106) are stirred together and a concentrated aqueous solution of from 0.25 to 1.25 parts of a polymerization product of ethylene oxide having a melting point of 54° C. are then added and the whole intimately mixed. A pigment suitable for printing wall-papers is obtained which yields prints having excellent covering power and beauty of shade.

Example 16

20 parts of heavy spar, 10 parts of aluminum sulphate (10 per cent aqueous solution), 5 parts of calcined soda (10 per cent aqueous solution) and 12 parts of barium chloride (10 per cent aqueous solution) are mixed together. The precipitate is washed three times with water and then 4.5 parts of the tungsto-molybdic compound of Brilliant Wool blue FFR extra (Schultz, Farbstofftabellen 1923, vol. 2, page 24) in the form of its 1 per cent aqueous solution, 0.45 to 1.8 parts of an ethylene oxide polymerization product having a melting point of 52° C. (10 per cent aqueous solution), 7 parts of barium chloride (10 per cent aqueous solution) and 0.75 part of aluminum sulphate (10 per cent aqueous solution) are added one after another. After separation by filtration the dye paste obtained is washed and worked up in the usual manner. A colour lake is obtained the shade of which is as equally strong as that of colour lakes obtained without the employment of the said polymerization product but containing about 15 to 30 per cent more of colouring matter. Moreover, the brilliancy is increased at the same time and the fastness to light is improved.

Example 17

12 parts of heavy spar are made into a paste with 100 parts of an aqueous 4 per cent suspension of alumina hydrate and 15 parts of lead acetate dissolved in 150 parts of water, from 2 to 3 parts of a polymerization product of ethylene oxide having a melting point of about 54° C. dissolved in five times their quantity of water are added and a solution of 6.2 parts of sodium bichromate in 62 parts of water is then introduced. The precipitate is filtered off, washed and dried, the colouring material having a purer and more greenish yellow shade than products obtained without the aid of the polymerization product of ethylene oxide. The colouring material may be employed for oil or glue paints.

Example 18

100 parts of Lithol Rubin B in the form of powder (Schultz, Farbstofftabellen 1923, vol. 1, No. 152) are intimately mixed with from 1 to 5 parts of a polymerization product of ethylene oxide having a melting point of 54° C. and made into a paste with from 50 to 100 parts of water. The polymerization product may also be added in solution, as for example as a 10 per cent aqueous solution, and the water may be replaced by organic solvents, as for example wholly or partially by ethyl alcohol. Contrasted with pastes prepared without the addition of the said polymerization product, the said addition produces an increased wetting action so that the further working up is considerably facilitated. The paste may be employed for paints or in the manufacture of coloured writing chalk.

Example 19

100 parts of heavy spar, 4 parts of Helio Fast red RL powder (Schultz, Farbstofftabellen 1923, vol. 1, No. 73), 5 parts of a polymerization product from ethylene oxide having a melting point of 57° C. are made into a paste with 100 parts of water. Contrasted with a mixture free from the said polymerization product, the addition of the said polymerization product renders it possible to wet the mixture about four times as quickly. Even in cases when mixtures are used which are brightened with from say 1 to 2 parts of mineral oil, petroleum jelly and the like, (as for example a mixture of 100 parts of heavy spar), 4 parts of Helio Fast red RL powder (Schultz, Farbstofftabellen 1923, vol. 1, No. 73), 1 to 2 parts of petroleum jelly, 0.2 to 0.5 part of a polymerization product from ethylene oxide having a melting point of 57° C. and from 2 to 5 parts of water prepared by intimately stirring, a more ready and intimate wetting is obtained by the said additions. Other substrata, such as mixtures of heavy spar and precipitated calcium sulphate or mixtures of gypsum and whiting and the like may be employed instead of heavy spar. The preparations may be employed in the manufacture of coloured writing chalk.

Example 20

From 5 to 10 parts of a polymerization product of ethylene oxide having a melting point of 48° C. are added to 100 parts of a metal bronze, which has or has not been mordanted with alum for the removal of paraffin oil, and stirred with 200 parts of water.

Alternatively, 100 parts of a metal bronze, 66 parts of a 15 per cent aqueous paste of the phosphotungsto-molybdic compound of methyl violet (Schultz, Farbstofftabellen 1923, vol. 1, No. 515) and from 200 to 300 parts of water are intimately stirred together.

In each case an increased wetting action combined with a good dispersion of the dyestuff is obtained.

What we claim is:

1. In the production of colloidal dispersions from suitable, solid and liquid substances and liquids in which the said substances are insoluble, the step which comprises adding to at least one of the said components of the dispersions a viscoid polymerization product of an alkylene oxide.

2. In the production of colloidal dispersions from suitable, solid and liquid substances and liquids in which the said substances are insoluble, the step which comprises adding to at least one of the said components of the dispersions a viscoid polymerization product of an alkylene oxide containing from 2 to 3 carbon atoms.

3. In the production of colloidal dispersions from suitable, solid and liquid substances and liquids in which the said substances are insoluble, the step which comprises precipitating a solid substance from a solution of a component thereof in a liquid, in which the said solid substance is practically insoluble, in the presence of a viscoid polymerization product of an alkylene oxide.

4. In the production of colloidal dispersions from suitable, solid and liquid substances and liquids in which the said substances are insoluble, the step which comprises precipitating a solid colouring material practically insoluble in water from a solution of a component thereof in water, in the presence of a viscoid polymerization product of an alkylene oxide.

5. As new compositions of matter colloidal dispersions from suitable, solid and liquid substances and liquids in which the said substances are insoluble, comprising the said materials and a viscoid polymerization product of an alkylene oxide.

6. As new compositions of matter colloidal dispersions from organic suitable, solid and liquid substances and liquids in which the said substances are insoluble, comprising the said materials and a viscoid polymerization product of an alkylene oxide containing from 2 to 3 carbon atoms.

7. As new compositions of matter colloidal dispersions from organic film-forming substances and liquids in which the said substances are insoluble, comprising the said materials and a viscoid polymerization product of an alkylene oxide containing from 2 to 3 carbon atoms.

8. As new compositions of matter colloidal dispersions from waxes and liquids in which the said waxes are insoluble, comprising the said materials and a viscoid polymerization product of an alkylene oxide containing from 2 to 3 carbon atoms.

9. As new compositions of matter colloidal dispersions from a wax and water, comprising the said materials and a viscoid polymerization product of an alkylene oxide containing from 2 to 3 carbon atoms.

10. As new compositions of matter colloidal dispersions from water-insoluble colouring materials and liquids in which the said colouring materials are insoluble, comprising the said materials and a viscoid polymerization product of an alkylene oxide.

LEO KOLLEK.
FRANZ POHL.